US011518502B2

(12) United States Patent
Sinusas et al.

(10) Patent No.: US 11,518,502 B2
(45) Date of Patent: Dec. 6, 2022

(54) ENERGY ABSORPTION STABILIZERS AND METHODS (71) Applicant: Bell Helicopter Textron Inc., Fort Worth, TX (US)

(72) Inventors: Eric Sinusas, Southlake, TX (US); Guillaume Noiseux-Boucher, Mirabel (CA); Olivier Boisvert, Mirabel (CA); Nicolas Doyon, Montreal (CA); Sebastien Duval, Terrebonne (CA)

(73) Assignee: Textron Innovations Inc., Providence, RI (US)

( * ) Notice: Subject to any disclaimer, the term of this patent is extended or adjusted under 35 U.S.C. 154(b) by 487 days.

(21) Appl. No.: 16/399,932

(22) Filed: Apr. 30, 2019

(65) Prior Publication Data

US 2020/0346742 A1 Nov. 5, 2020

(51) Int. Cl.
*B64C 25/58* (2006.01)

(52) U.S. Cl.
CPC .................................. *B64C 25/58* (2013.01)

(58) Field of Classification Search
CPC ... B64C 2025/325; B64C 25/32; B64C 25/58; B64C 27/04; B64C 5/12; B64C 1/00; B64C 1/062; B64C 5/06; B64C 1/12; B64C 2001/0072; B64C 5/00
See application file for complete search history.

(56) References Cited

U.S. PATENT DOCUMENTS

| 2,813,701 | A | * | 11/1957 | Fenger | F28D 9/0068 165/147 |
| 4,432,516 | A | * | 2/1984 | Muscatell | B64C 3/48 244/113 |
| 4,600,168 | A | * | 7/1986 | Selecman | B64C 25/001 244/17.17 |
| 5,184,145 | A | * | 2/1993 | Devillers | H01Q 1/1235 343/840 |
| 5,367,970 | A | * | 11/1994 | Beauchamp | B63B 39/06 114/140 |
| 5,927,646 | A | * | 7/1999 | Sandy | B64C 25/52 244/108 |
| 6,045,096 | A | * | 4/2000 | Rinn | B64C 3/48 244/219 |
| 6,616,101 | B2 | | 9/2003 | De Castro et al. | |
| 7,461,820 | B2 | * | 12/2008 | Grove | B64C 21/04 244/219 |
| 7,918,421 | B2 | * | 4/2011 | Voglsinger | B64C 3/48 244/219 |
| 8,066,222 | B2 | * | 11/2011 | Lee | B64C 5/02 244/121 |
| 8,262,032 | B2 | * | 9/2012 | Sanderson | B64C 3/185 244/219 |
| 8,267,654 | B2 | * | 9/2012 | van Dam | F03D 1/0675 416/14 |

(Continued)

*Primary Examiner* — Medhat Badawi
(74) *Attorney, Agent, or Firm* — Pramudji Law Group PLLC; Ari Pramudji (57) ABSTRACT According to one implementation of the present disclosure, a stabilizer of an aircraft includes an energy absorbing assembly. The energy absorbing assembly includes first and second portions and a retractable section. The retractable section may be at least partially affixed to the first portion and is configured to enable displacement of the second portion of the stabilizer with respect to the first portion.

20 Claims, 5 Drawing Sheets

(56) References Cited

U.S. PATENT DOCUMENTS

| | | | |
|---|---|---|---|
| 8,376,275 B2* | 2/2013 | Bolukbasi | B64C 1/062 244/119 |
| 9,233,749 B1* | 1/2016 | Joo | B64C 3/48 |
| 9,260,070 B2* | 2/2016 | Borger | B60R 19/34 |
| 9,611,030 B2 | 4/2017 | Petiot et al. | |
| 9,625,361 B1* | 4/2017 | Vail, III | G01N 3/08 |
| 9,944,356 B1* | 4/2018 | Wigley | B64C 9/00 |
| 10,035,579 B2* | 7/2018 | Iglesias | B64C 3/48 |
| 10,086,930 B2* | 10/2018 | Mellor | B64C 25/52 |
| 10,392,088 B2* | 8/2019 | Morel | B64C 3/52 |
| 10,773,790 B2* | 9/2020 | Menard | B64C 5/06 |
| 2002/0011540 A1* | 1/2002 | De Castro Nodal | B64C 3/20 244/45 R |
| 2006/0273600 A1* | 12/2006 | Rohlf | A62B 35/0068 248/683 |
| 2007/0000557 A1* | 1/2007 | Kuntz | B64F 1/28 141/65 |
| 2007/0194588 A1* | 8/2007 | Taubert | F16B 45/00 296/37.14 |
| 2008/0149769 A1* | 6/2008 | Koch | B64C 1/12 244/121 |
| 2008/0265095 A1* | 10/2008 | Lee | B64C 1/062 244/129.1 |
| 2010/0148006 A1* | 6/2010 | Olmi | B64C 3/28 244/121 |
| 2011/0127377 A1* | 6/2011 | Prud'Homme-Lacroix | B64C 25/52 244/109 |
| 2011/0206875 A1* | 8/2011 | Kohlen | B29C 70/32 428/34.1 |
| 2012/0318913 A1* | 12/2012 | Filho | B64D 41/00 244/58 |
| 2013/0001356 A1* | 1/2013 | Llamas Sand n | B64C 1/26 244/54 |
| 2013/0112811 A1* | 5/2013 | Mayer | B64C 1/062 244/119 |
| 2013/0277499 A1* | 10/2013 | Lecerf | B64C 3/185 244/123.1 |
| 2014/0001312 A1* | 1/2014 | Milliere | B64C 1/062 244/121 |
| 2014/0144740 A1* | 5/2014 | Ludin | F16F 7/12 29/428 |
| 2015/0344125 A1* | 12/2015 | Petiot | B64C 7/00 244/133 |
| 2015/0353185 A1* | 12/2015 | Petiot | F42D 5/045 244/123.6 |
| 2018/0134365 A1* | 5/2018 | Knipprath | B64C 3/187 |
| 2018/0170520 A1* | 6/2018 | Menard | B64C 5/06 |
| 2020/0346737 A1* | 11/2020 | Sinusas | B64F 5/10 |

\* cited by examiner

ENERGY ABSORPTION STABILIZERS AND METHODS

STATEMENT REGARDING FEDERALLY SPONSORED RESEARCH OR DEVELOPMENT

Not applicable.

BACKGROUND

For landing an aircraft, such as a rotorcraft (i.e., helicopter), a tail skid is attached to a distal end of a stabilizer (i.e., vertical tail tin or horizontal stabilizer) to minimize and/or prevent damage to the rotorcraft when the stabilizer contacts the ground. During such an impact event, a tail skid deforms and absorbs the energy generated. Hence, impact load induced by a tail landing on the tail boom airframe structure of the aircraft may be reduced.

Currently, tail skids are made of a circular tube design that are bolted on stabilizers and are formed from metal alloys. Such tail skids require their own support structure independent of the stabilizer, which often increases stabilizer weight requirements. Also, to adequately provide for sufficient ground clearance, the inclusion of a tail skid further contributes to limitations for the dimensions and aerodynamic performance of the stabilizer.

SUMMARY

According to one implementation of the present disclosure, a stabilizer of an aircraft includes an energy absorbing assembly. The energy absorbing assembly includes first and second portions and a retractable section. The retractable section may be at least partially affixed to the first portion and is configured to enable displacement of the second portion of the stabilizer with respect to the first portion.

According to another implementation of the present disclosure, a method of energy absorption by a stabilizer includes setting, in a first positioning, first and second portions of the stabilizer. In the first positioning, the first and second portions are encased in an outer skin, separated by an air gap, and adjoined by a retractable section. Also, in response to an impact event, the method includes engaging a retractable section of the stabilizer to resistively displace the second portion to converge the first portion over the air gap.

According to another implementation of the present disclosure, a method of energy absorption by a stabilizer includes forming a first portion of the stabilizer. The method further includes forming a retractable section that is at least partially affixed to the first portion. Also, the retractable system may be configured to enable displacement of a second portion of the stabilizer with respect to the first portion.

The above-referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, or apparatuses described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

Example embodiments of the present disclosure allow for energy from an impact to be absorbed by the stabilizer itself through either elastic or plastic deformation, such that either minimal or no damage may be transferred to the tail boom/airframe structure of the aircraft. In doing so, energy absorption capabilities can be provided within the sleek airfoil design (i.e., aerodynamic shape) of the stabilizer itself that is already optimized for peak aerodynamic performance (e.g., to stabilize the aircraft, and to minimize drag and provide lift). Moreover, the stabilizers and methods described herein further allow for different stabilizer energy absorption levels by adjusting the amount of admissible friction that can be introduced. In addition, the stabilizers and methods described herein: promote greater ease in flight test collection, promote lower cost and less weight by reducing part counts via the elimination, and allow for increases in stabilizer aerodynamic surface dimensions.

Figure 1A:
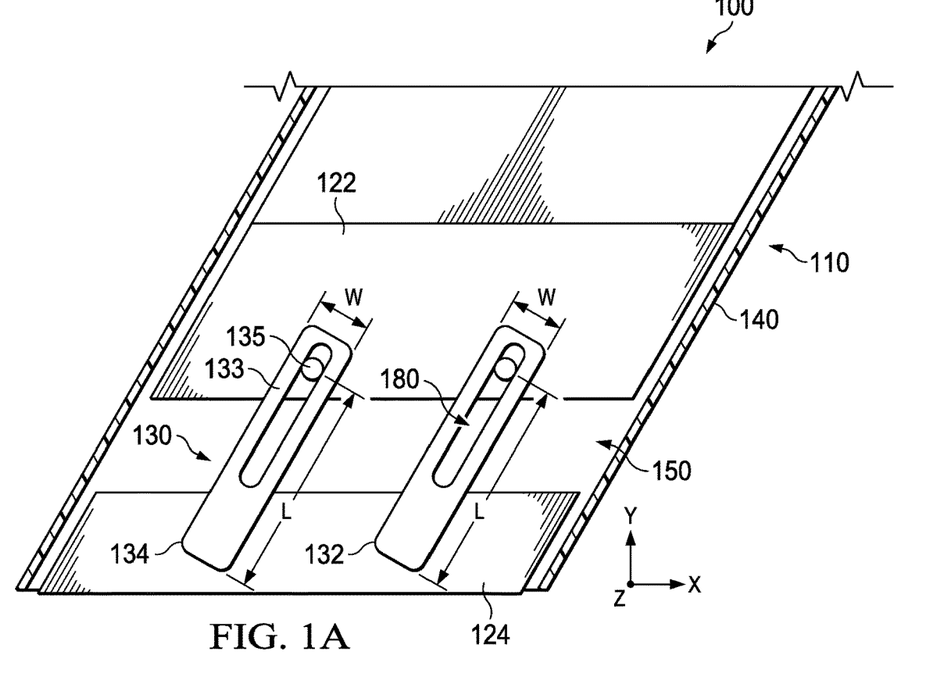
FIGS. 1A and 1B illustrate cross-sectional top views of an energy absorbing assembly in accordance with implementations of various techniques described herein.
Figure 1B:
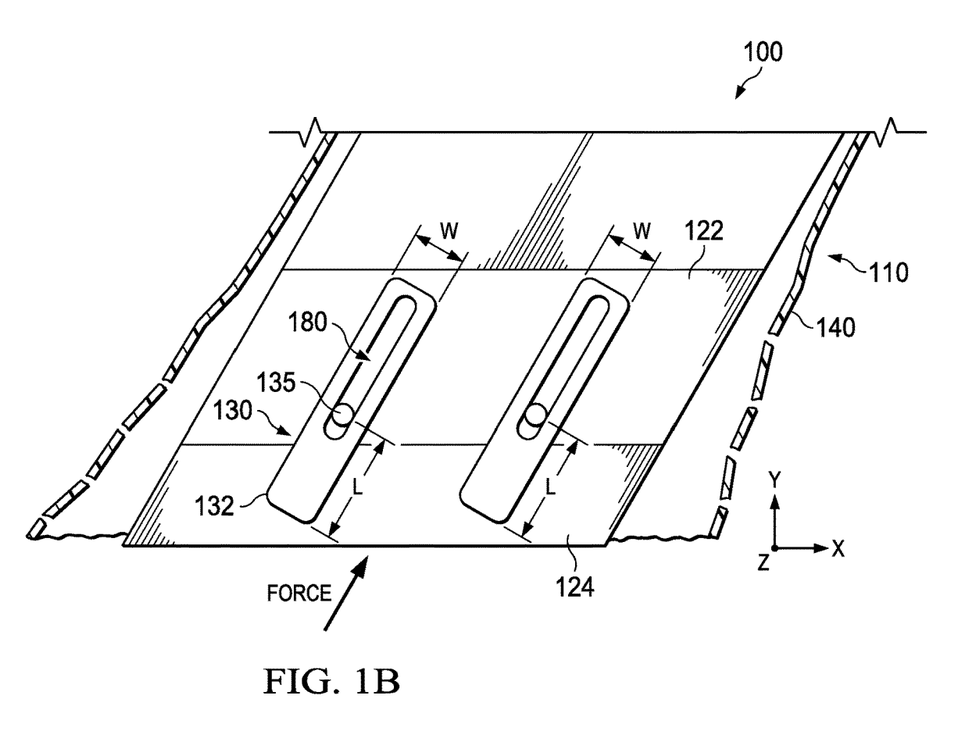

Referring to FIGS. 1A-1B, cross-sectional top-views of an energy absorbing assembly (i.e., an energy absorbing system, an energy absorbing section, an assembly) 110 of a stabilizer 100 for an aircraft is shown in a first positioning (FIG. 1A) and a second positioning (FIG. 1B). In various embodiments, the stabilizer 100 may be a vertical stabilizer (i.e., a fin, a tail fin, a vertical plank) or a horizontal stabilizer (i.e., a horizontal fin, a horizontal plank) of the aircraft. FIG. 1A illustrates the energy absorbing assembly 110 of the stabilizer 100 in the first positioning (i.e., prior to an impact event), while FIG. 1B illustrates the energy absorbing assembly 110 of the stabilizer 100 in the second positioning (i.e., after an impact event). As shown in FIGS. 1A and 1B, the energy absorbing assembly 110 may include a first portion 122 (e.g. an upper portion), a second portion (e.g., a lower portion) 124, and a retractable section 130 (i.e., a resettable section) (e.g., a mechanical retractable section). The retractable section 130 may be at least partially affixed to the first portion 122 and is configured to enable displacement of the second portion 124 of the stabilizer 100 with respect to the first portion 122. In example embodiments, the first and second portions 122, 124 may be made of the same rigid material(s) as that of the rest of the stabilizer 100 itself that is optimized for predefined aerodynamic load requirements. As illustrated, the cross-sectional top-views in FIGS. 1A-1B depict the X-direction (i.e., X-axis) and Y-direction (i.e., Y-axis), while the Z-direction (i.e., Z-axis) would extend vertically outward from the page.

In certain aspects, for example, the first and second portions 122, 124 may be distinct regions of the stabilizer 100 that may be either contiguous to, or alternatively, coupled to the stabilizer 100. The first and second portions 122, 124 may be part of the airfoil itself, and have aerodynamic loading such that the portions 122, 124 are able to provide aerodynamic lift (i.e., the force that is perpendicular to the oncoming air-flow). The first and second portions 122, 124 may be made of any light-weight but rigid composite core material (e.g., fiber-reinforced plastics (e.g., tailored glass fiber, fiberglass, foams) and/or a thin metal (e.g., a metal alloy such as an aluminum or titanium alloy) etc. that can be substantially the same as the other regions of the stabilizer. Upon an impact event, the second portion may be configured to either elastically or plastically deform.

The stabilizer 100 may further include an outer skin 140 (i.e., a shell, a wrapper, a composite skin) that fully encloses the first and second portions 122, 124 and the retractable section 130. As FIGS. 1A-1B are cross-sectional views, the outer skin 140 is shown only on the outer edges of the energy absorbing assembly 110. Nevertheless, in a full depiction, the outer skin 140 may fully surround at least the energy absorbing assembly 110 of the stabilizer 100 and provide one or more aerodynamic surfaces of the aerodynamics shape of the airfoil. Hence, the outer skin 140 may facilitate the requisite aerodynamic performance (such as to minimize drag and increase lift). The outer skin 140 may be made from any rigid, light-weight material including a fabric (e.g., fabric layers, composite fibers) or a thin metal (e.g., a metal alloy such as an aluminum alloy) etc. As shown in FIG. 1B, in some cases upon an impact event, the outer skin 140 would collapse on itself or detach (e.g., "fall-off") from the energy absorbing assembly 110 including the first and second portions 122, 124 and the retractable section 130.

The stabilizer 100 may further include an air gap 150 located between the first and second portions 122, 124, and proximate to the retractable section 130. The air gap 150 may be fully enclosed by the outer skin 140. During an impact event, the second portion 124 may be compressed over the air gap 150 such that the second portion 124 displaces toward the first portion 122. In example implementations, upon an impact event, the displacement of the second portion 124 may be one of linear displacement, axial displacement, or angular displacement with relation to the first portion 122.

In certain implementations, as shown in FIGS. 1A-1B, for example, the retractable section 130 may include one or more plates 132 (e.g., rigid metal or rigid composite plastic plates) that are at least partially adjoined to the first portion 122 of the energy absorbing assembly 100. The one or more plates 132 may be configured to align the displacement of the second section 120 in the direction of the first portion 110. In a particular implementation, the one or more plates 132 may have a greater length (L) than that of the width (W) of the one or more plates 132. In some cases, each of the one or more plates 132 may include a respective aperture 180 (i.e., a narrow aperture, slot, groove, orifice, a through circumferentially enclosed opening). In certain examples, the respective aperture(s) 180 may be of a similar shape and extend along an interior portion of the one or more plates 132. Moreover, in such examples, the respective aperture(s) 180 may be constructed such that, in the first positioning (as shown in FIG. 1A), the aperture(s) may extend upon the one or more plates 132 over the overlapping area of the air gap 150, but not over the intersection of the one of more plates 132 and the second portion 124. Advantageously, such a construction allows for the most surface area of contact and coupling between the lower end 134 (e.g., below the respective apertures 180 in the longitudinal Y-axis) of the one or more plates 132 and the second portion 124. Hence, upon an occurrence of an impact event, the normal force that is enacted upon the second portion 124 would be significantly translated to the one or more plates 132.

In one example implementation (not shown), the lower end 134 (e.g., below the respective apertures 180 in the longitudinal Y-axis) of the one or more plates 132 may be retractable extension plate portions of the one or more plates 132 in such an implementation, the retractable extension plate portions 134 may be configured to resistively "slide" (via kinetic friction) into respective upper portions 133 of the one or more plates 132. As such, the extension plate portions may allow for ease in resetting the retractable portion 130 back to a first positioning.

In some cases, the retractable section may further include a fastener 135 (i.e., a threaded fastener, a bolt, a screw, a pin, etc.) and an associated lock washer (or nut) (not shown). For instance, the fastener 135 and the associated washer (or nut) (e.g., lock washers, locknuts, jam nuts, etc.) may be configured to secure (e.g., adjoin, affix) a first end 133 (e.g., an upper end) of the one or more plates 132 and the first portion 122 of the stabilizer 100. In some examples, a diameter of the fastener 135 may be greater than a width of an associated aperture 180. In such examples, upon an impact event, a greater kinetic frictional force (i.e., resistive force of friction) is generated between the fastener 135 and the associated aperture 180 as part of the resistive displacement. Moreover, in various implementations of these examples, different diameter sizes of the fastener 135 may be employed so as to generate different coefficients of friction between the fastener 135 and the associated aperture 180; thus, resulting in different magnitudes of kinetic frictional force. In other cases, either instead of, or in addition to, the fastener 135 and washer (or nut) coupling, one or more brackets (not shown) may be used to affix the one or more plates 132 of the retractable section 130 to the first and second portions 122, 124.

In one instance (not shown), the one or more plates 132 may include one or more notches (not shown) at equidistant intervals along the aperture 180. In such an instance, upon an impact event, energy absorption metrics (i.e., levels, values) of the stabilizer 100 may correspond to displacements of the second portion 124 to the one or more notches along the aperture 180. Accordingly, the energy absorbing assembly 110 may be customized through the capacity to vary admissible magnitudes of force from an impact (e.g., the kinetic force of friction (i.e., sliding friction) within the retractable section 130. In some examples that do not include the one or more notches, energy absorption metrics may be calibrated in increments directly on the one or more plates 132 that correspond to different respective magnitudes of sliding friction.

In addition, while FIGS. 1A-1B illustrate the one or more plates 132 (as well as the aperture(s) 180 and the fastener(s) 135) as adjoined on outer sides of the first and second portions 122, 124, in an alternative implementation, the one or more plates 132 (as well as the aperture(s) 180 and the fastener(s) 135) may be adjoined on inner sides of the first and second portions 122, 124. Also, in a second alternative implementation, the one or more plates 132 (as well as the aperture(s) 180 and the fastener(s) 135) may be adjoined such that the one or more plates 132 (as well as the aperture(s) 180 and the fastener(s) 135) and the first and second portions 122, 124 are coplanar on the Z-axis. In such a second alternative implementation, an additional advantage is that the stabilizer 100 can maintain an optimally sleek and precise aerodynamic shape as per build requirements.

In some cases, the one or more plates 132 may be diagonally-positioned (i.e., having a particular slope) with reference to a plane on the X-axis and Y-axis. In such cases, particular angles of orientation corresponding to the angle formed between the length (L) of the one or more plates 132 and the width (W) of the first and/or second portions 122, 124 may be less than 90°. Advantageously, such an angle of orientation may allow for greater amounts of energy from impact to be received and absorbed by the retractable section 130 (in comparison to a 90° angle of orientation). In alternative cases, the one or more plates 132 may be positioned according to other angles of orientation where the angle formed between the length (L) of the one or more plates 132 and the width (W) of the first and/or second portions 122, 124 may be substantially equal to 90°, or greater than 90°.

In some cases (not shown), the one or more plates 132 may be diagonally-positioned (i.e., having a particular slope) with reference to a plane on the Y-axis and Z-axis, whereby the first end 133 and the second end 134 of the one or more plates 132 may include different heights (e.g., in the vertical Z-axis). Such cases may be combined with any of the angle of orientation implementations in the X-axis and Y-axis. As an example, in a particular implementation where the one or more plates 132 may include equidistant notches (not shown), depending on different magnitudes of force during an impact, the second portion 124 may displace a different number of notches as measured on the one or more plates 132. Accordingly, the stabilizer 100 allows for greater customization by varying the admissible magnitude of sliding friction within the retractable section 130.

In certain implementations, the retractable section 130 may include other types of energy absorbing mechanisms (i.e., mechanical devices) that allow for the resettable displacement of a second portion 124 of a stabilizer 100 with respect to a first portion 122. Such retractable sections 130 include but are not limited to: a mechanical damper and coil spring mechanism 530 (as described with reference to FIG. 5 in below paragraphs), an energy absorption device 630 (as described with reference to FIG. 6 in below paragraphs), a shaft and bearing/compression mechanism (not shown), a retractable arm (not shown), or a one-side pull retractable cable (not shown). Each of the retractable sections 130 may include one or more components to provide energy absorption. Moreover, such retractable sections 130 may be made from rigid materials, including metal alloys or composite plastics.

Advantageously, in implementations of the present invention, the assembly 110 allows for energy to be absorbed during an impact event by either elastic or plastic deformation, such that either minimal or no damage may be transferred from the stabilizer 100 to the airframe structure of the aircraft. In essence, the energy absorption capacity is integral within the aerodynamic shape of the stabilizer 100 necessary for optimal aerodynamic performance. For instance, the stabilizer 100 includes a precise size and shape, and exact dimension angles that are based on computational fluid dynamics and flight tests.

As a further advantage, because the assembly 110 includes a retractable section 130 that may be resettable, several applications of the assembly 110 is envisioned. As an additional feature, energy absorption levels (i.e., metrics) may be customized by varying the admissible magnitude of sliding friction within the retractable section 130. In example implementations, this customization may vary based on the different types of retractable sections 130 as described herein.

The assembly 110 may also be used for "quick" flight evaluation. For example, an operator may set (position) a stabilizer (i.e., vertical fin or a horizontal stabilizer that incorporates the assembly 110) on an aircraft and conduct a flight-test. In doing so, the operator can cost-effectively obtain flight-test data related to the efficacy of the stabilizer. Upon determining, based on the obtained flight-test data that the stabilizer is inadequate in some way, the operator can easily remove the stabilizer and easily install a new one (incorporating a new assembly 110) due to the modular and adjustable surface dimensions of the assembly 110. Thus, the operator may efficiently build upon (e.g., manipulate/ tweak) the data, and is empowered to obtain further data. Hence, through such an evaluation, an operator can determine whether the handling qualities of the aircraft (for a horizontal stabilizer) or energy absorption metrics (for a vertical fin) meet a particular criterion.

One further advantage, resulting from the elimination of the tail skid in the inventive aspects, is the capacity to design the stabilizer with greater surface area/dimensions. For example, to reduce torsional load in the tail boom, aircraft designers would prefer, having to the extent possible, equivalent surface area on both the top and bottom sides of a vertical fin. Hence, when aerodynamic loads are introduced during flight, the torsional load and stresses on the tail boom may be substantially neutralized. In addition, by removing the tail skids a greater flare angle for landing may also be realized.

In one particular implementation, a stabilizer (incorporating the assembly 110) may be activated by an operator (e.g., a pilot or flight computer) through a flight control system to improve ground clearance. For example, such an implementation could be initiated when landing on uneven soil.

Figure 2:
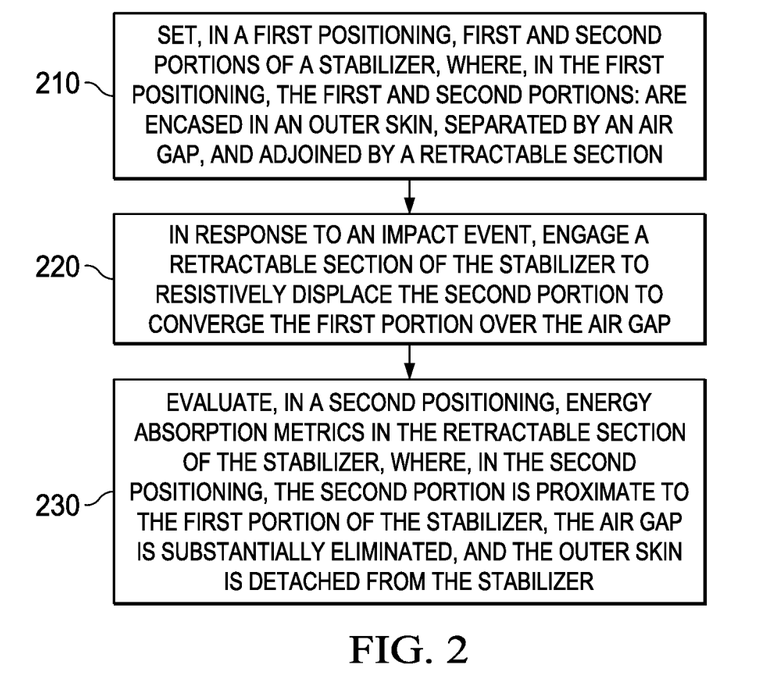
FIG. 2 is a particular illustrative aspect of methods in accordance with implementations of various techniques described herein.

Referring to FIG. 2, a method of energy absorption 200 applicable for the above-described stabilizer 100 is shown. The operation 200 may be performed by any of the stabilizer implementations as described herein including stabilizers 100, 300, 400, 500, and 600 as described with reference to FIGS. 1, 3, 4, 5, and 6 (as well as described implementations that are not shown).

In one example implementation, at step 210, in the first positioning (as shown in FIG. 1A), the first and second portions 122, 124 of the stabilizer 100 are initially set to be separated by the air gap 150. As shown in FIG. 1A, prior to an impact event, the interval between the fastener 135 and a distal end of the one or more plates 132 is a first length (L). Upon an impact event (e.g., as when the stabilizer 100 contacts the ground upon a tail-landing), at step 220, the second portion 124 receives the impact resistive force (i.e., the normal force in the opposite vector from the angle of impact) and engages the retractable section 130 to displace the second portion 124. In doing so, the second portion 124 and the attached one or more plates 132 are caused to resistively displace (e.g., move with a resistive force of friction) according to the force vector of the first portion 122 over the air gap 150. Accordingly, the second portion 124 of the one or more plates 132 would resistively displace a first interval along the respective aperture 180 until the fastener 135 is situated in a lower end of the respective aperture 180 and the first and second portions 122, 124 are positioned proximate (i.e., converge) to one another. At step 230 (as shown in FIG. 1B), in the second positioning, the air gap 150 between the first and second portions 122, 124 may be either partially or fully eliminated. After the impact event, the interval between the fastener 135 and the distal end of the one or more plates 132 is now a second length (L2). In such an example, the fastener 135 itself would not shift, however, the aperture 180 resistively displaces as a result of the enacted force. Furthermore, as a result of the impact, the outer skin 140 would detach (e.g., "break-off") from the first and second portions 122, 124 and the retractable section 130. In such an implementation, at the second positioning, based on energy absorption metrics of the stabilizer corresponding to difference magnitudes of sliding friction, an evaluation/determination may be made of the retractable section 130 (in accordance with example implementations as described herein) as to the magnitude of the force on impact as well as the capacity of the stabilizer to withstand the impact.

Figure 3:
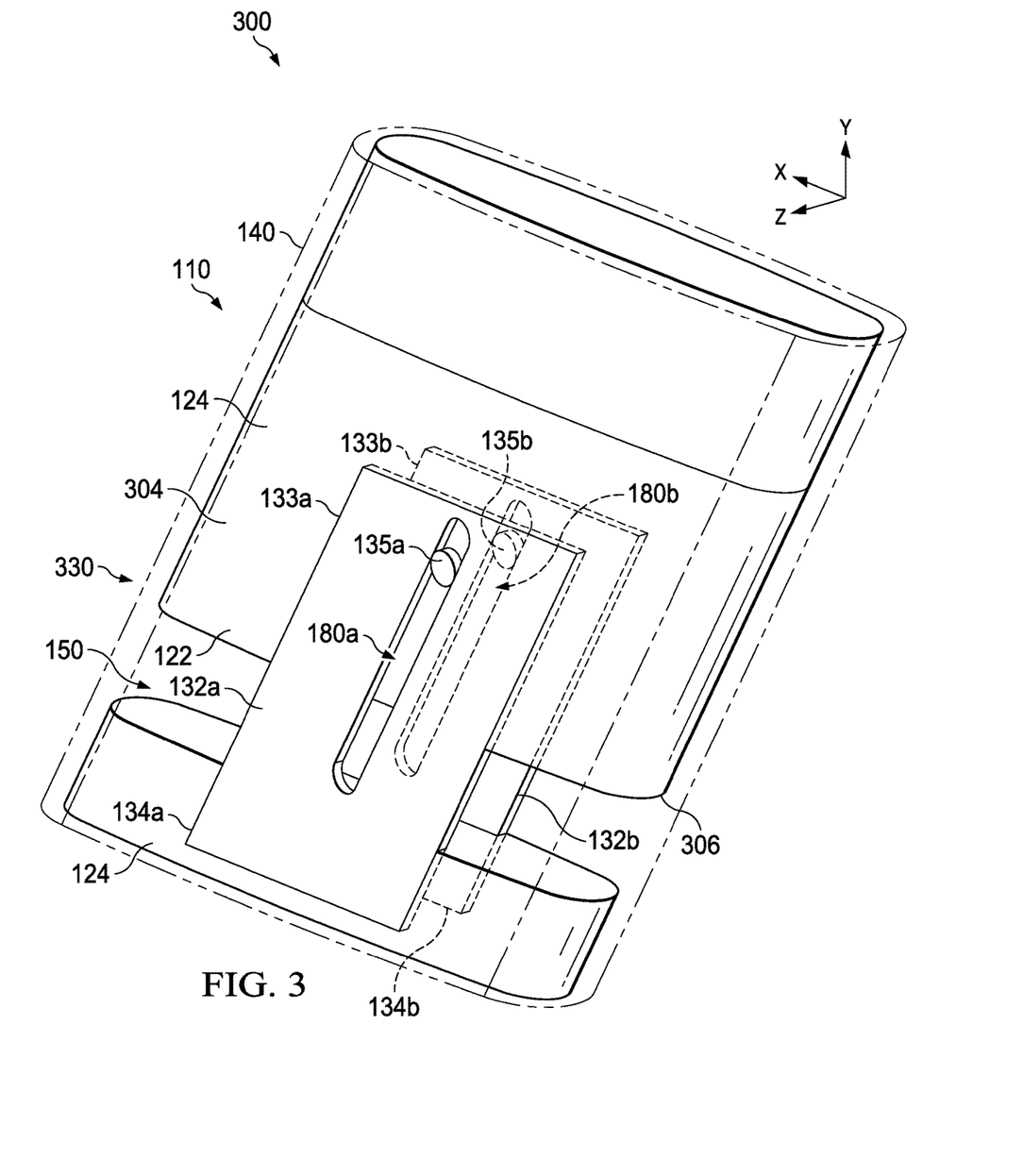
FIG. 3 illustrates a cut-away perspective of an energy absorbing assembly in accordance with implementations of various techniques described herein.

Referring to FIG. 3, a cut-away perspective view of an energy absorbing assembly (i.e., an energy absorbing section, an assembly) 110 of a stabilizer 300 for an aircraft is shown. In various embodiments, the stabilizer 300 may be a vertical stabilizer (i.e., a fin, a tail fin, a vertical plank) or a horizontal stabilizer (i.e., a horizontal fin, a horizontal plank) of the aircraft. As shown in FIG. 3, the energy absorbing assembly 110 may include a first portion 122 (e.g. an upper portion), a second portion (e.g., a lower portion) 124, and a retractable section 330 (i.e., a resettable section) (e.g., a mechanical retractable section). The retractable section 330 may be at least partially affixed to the first portion 122 and is configured to enable displacement of the second portion 124 of the stabilizer 100 with respect to the first portion 122. As depicted, the energy absorbing assembly 110 in FIG. 3 is substantially similar in construction, materials, and operation to the first positioning (i.e., prior to an impact event) of the energy absorbing assembly 110 in FIG. 1A, with one notable distinction that the one or more plates 132 are depicted as first and second plates 132a, 132b positioned on first and second sides (i.e., opposing sides, front and back sides) 304, 306 of the stabilizer 300, where each of the plates 132a, 132b includes a respective aperture 180a, 180b. In addition, as shown in FIG. 3, the one or more plates 132a, 132b (as well as the apertures 180a, 180b and the fasteners 135a, 135b) and the first and second portions 122, 124 are coplanar on the Z-axis. Accordingly, the stabilizer 300 can maintain an optimally sleek and precise aerodynamic shape as per build requirements. In alternative implementations, the one or more plates 132a, 132b (as well as the apertures 180a, 180b and the fasteners 135a, 135b) may be either adjoined on outer or inner sides of the first and second portions 122, 124. Moreover, the one or more plates 132 may have first and second ends 133(a,b), 134(a,b) that function similarly to the first end 133 and second end 134 of the one or more plates 132 as described with reference to FIGS. 1A-1B. In certain examples, the retractable section 430 further includes respective first and second fasteners 135a, 135b (and associated nuts/washers) that are configured to secure the respective first ends 133a, 133b to (opposing sides of) the first portion 122 of the stabilizer 100. Although not shown, the energy absorbing assembly 110 of the stabilizer 300 may be depicted similarly to as described in FIG. 1B for the second positioning (i.e., after an impact event). As illustrated, the cut-away perspective view in FIG. 3 is depicted in three dimensions: the X-direction, the Y-direction, and the Z-direction as the height of the stabilizer 300.

Figure 4:
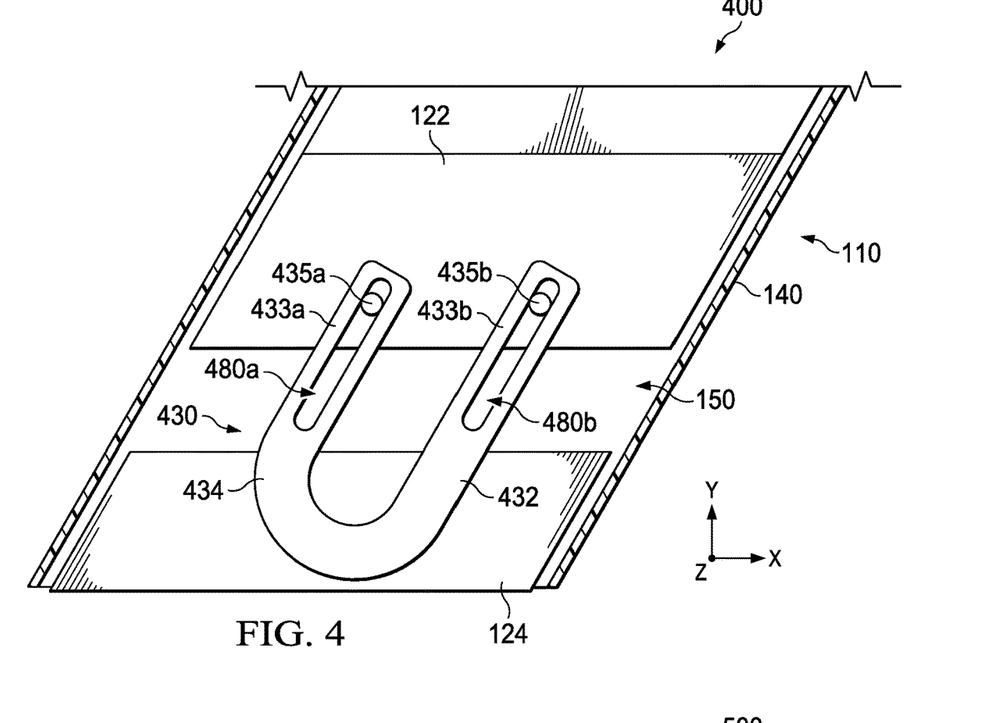
FIG. 4 illustrates a cross-sectional top view of an energy absorbing assembly in accordance with implementations of various techniques described herein.

Referring to FIG. 4, a cross-sectional top-view of an energy absorbing assembly (i.e., an energy absorbing system, an energy absorbing section, an assembly) 110 of a stabilizer 400 for an aircraft is shown. The stabilizer 400 may be a vertical stabilizer (i.e., a vertical fin, a tail fin, a vertical plank) or a horizontal stabilizer (i.e., a horizontal fin, a horizontal plank) of the aircraft. As shown in FIG. 4, the energy absorbing assembly 110 may include a first portion 122 (e.g. an upper portion), a second portion (e.g., a lower portion) 124, and a retractable section 430 (i.e., a resettable section) (e.g., a mechanical retractable section). The retractable section 430 may be at least partially affixed to the first portion 122 and is configured to enable displacement of the second portion 124 of the stabilizer 100 with respect to the first portion 122. As depicted, the energy absorbing assembly 110 in FIG. 4 is substantially similar in construction, materials, and operation to the first positioning (i.e., prior to an impact event) of the energy absorbing assembly 10 in FIG. 1A, with one notable distinction that as part of the retractable section 430, the one or more plates are depicted as a U-shaped plate 432 (i.e., an arc-plate), where the U-shaped plate 432 includes at least two apertures (480a, 480b). In addition, while FIG. 4 illustrates the U-shaped plate 432 (as well as the apertures 480a, 480b and the fasteners 435a, 435b) as adjoined on outer sides of the first and second portions 122, 124, in an alternative implementation, the U-shaped plate 432 (as well as the apertures 480a, 480b and the fasteners 435a, 435b) may be adjoined on the inner sides of the first and second portions 122, 124. Also, in a second alternative implementation, the U-shaped plate 432 ((as well as the apertures 480a, 480b and the fasteners 435a, 435b) may be adjoined such that the U-shaped plate 432 (as well as the apertures 480a, 480b and the fasteners 435a, 435b) and the first and second portions 122, 124 are coplanar on the Z-axis. In such a second alternative implementation, an additional advantage is that the stabilizer 400 can maintain an optimally sleek and precise aerodynamic shape as per build requirements. Moreover, the U-shaped plates 432 may have first and second ends 433(a,b), 434 (a,b) that function similarly to the first end 133 and second end 134 of the one or more plates 132 as described with reference to FIGS. 1A-1B. In certain examples, the retractable section 430 further includes respective first and second fasteners 435a, 435b (and associated nuts/washers) that are configured to secure the respective first ends 433a, 433b of the U-shaped plate 432 to the first portion 122 of the stabilizer 100. In addition, while it is not shown, the energy absorbing assembly 110 of the stabilizer 400 may be depicted in a similar manner as described with reference to FIG. 1B for the second positioning (i.e., after an impact event). As illustrated, the cross-sectional top-view in FIG. 4 depicts the X-direction, the Y-direction, and the Z-direction as the height of the stabilizer 400 (that extends vertical outward from the page).

In other example implementations (not shown), the one or more plates may include first and second U-shaped plates. In further examples, the first and second U-shaped plates may be on the same side or, alternatively, on opposing side of the stabilizer 100.

Figure 5:
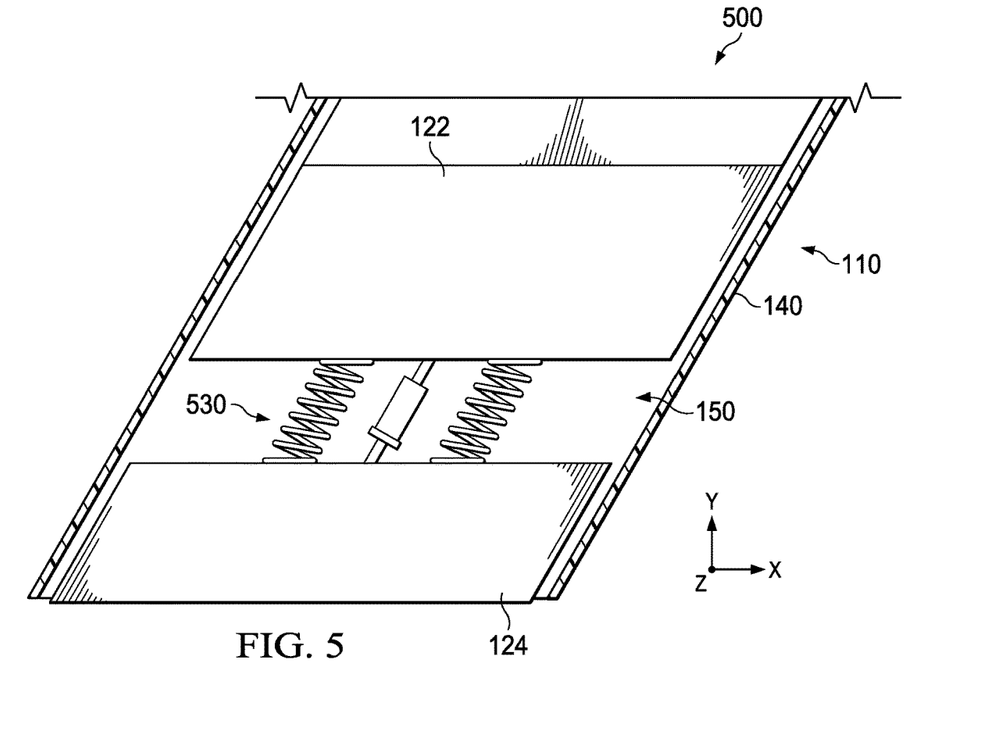
FIG. 5 illustrates a cross-sectional top view of an energy absorbing assembly in accordance with implementations of various techniques described herein.

Referring to FIG. 5, a cross-sectional top-view of an energy absorbing assembly (i.e., an energy absorbing section, an energy absorbing system, an assembly) 110 of a stabilizer 500 for an aircraft is shown. In various embodiments, the stabilizer 500 may be a vertical stabilizer (i.e., a fin, a tail fin, a vertical plank) or a horizontal stabilizer (i.e., a horizontal fin, a horizontal plank) of the aircraft. As shown in FIG. 5, the energy absorbing assembly 110 may include a first portion 122 (e.g. an upper portion), a second portion (e.g., a lower portion) 124, and a retractable section 530 (i.e., a resettable section) (e.g., a mechanical retractable section). The retractable section 530 may be at least partially affixed to the first portion 122 and is configured to enable displacement of the second portion 124 of the stabilizer 100 with respect to the first portion 122. As depicted, the energy absorbing assembly 110 in FIG. 5 is substantially similar in construction, materials, and operation to the first positioning (i.e., prior to an impact event) of the energy absorbing assembly 110 in FIG. 1A, with one notable distinction that the retractable section 530 includes one or more mechanical damper and coil spring mechanisms 530. Suitably, the one or more mechanical damper and coil spring mechanisms 530 may be adjoined to the first and second portions 122, 124 such that the stabilizer 500 has an optimally sleek and precise aerodynamic shape as per build requirements. Although not shown, with respect to construction (excluding the one or more mechanical damper and coil spring mechanisms 530) and operation, the energy absorbing assembly 110 of the stabilizer 500 may be depicted in a similar manner as described in FIG. 1B for the second positioning (i.e., after an impact event). In contrast, however, owing to its "springing" nature after an impact event, the one or more mechanical damper and coil spring mechanisms 530 may retract quickly back to the first positioning. In certain implementations (not shown), the one or more mechanical damper and coil spring mechanism 530 may be either attached or coupled to the first and second portions 122, 124 via one or more brackets or other types of fasteners. As illustrated, the cross-sectional top-view in FIG. 5 depicts the X-direction, the Y-direction, and the Z-direction as the height of the stabilizer 500 (that extends vertical outward from the page).

In one implementation (not shown), the retractable section 530 may include one or mechanical dampers 530 instead of one or more mechanical damper and coil spring mechanisms 530. In such an implementation, the mechanical damper(s) 530 would provide energy absorption capabilities similar to other examples as described herein.

Figure 6:
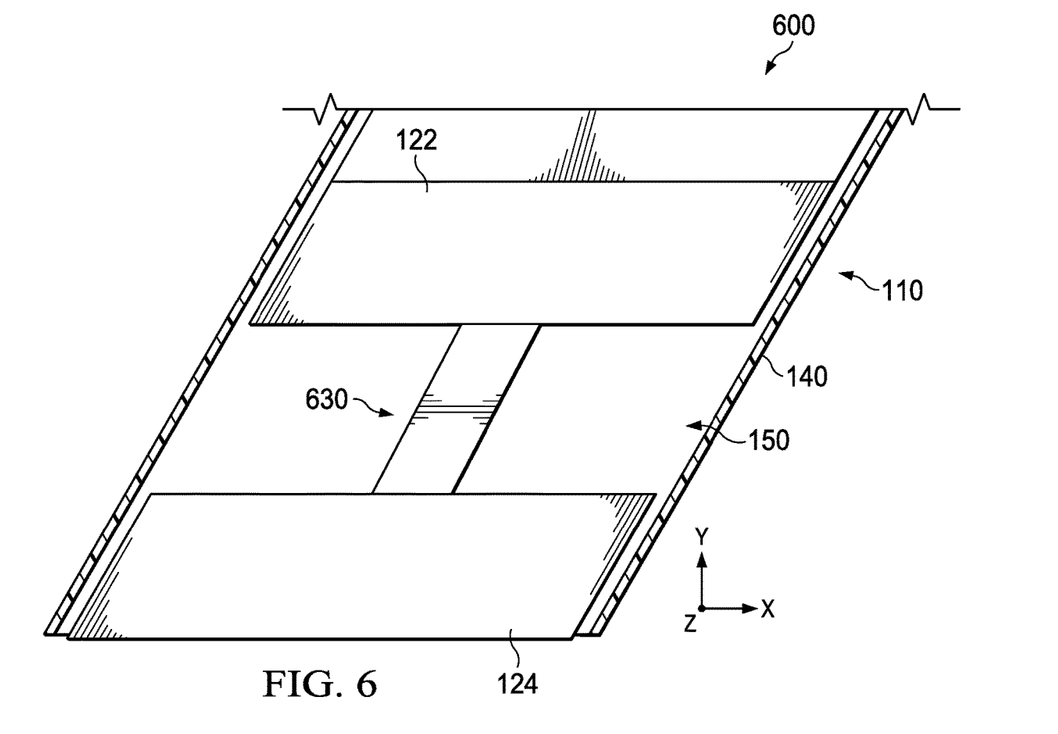
FIG. 6 illustrates a cross-sectional top view of an energy absorbing assembly in accordance with implementations of various techniques described herein.

Referring to FIG. 6, a cross-sectional top-view of an energy absorbing assembly (i.e., an energy absorbing section, an energy absorbing system, an assembly) 110 of a stabilizer 600 for an aircraft is shown. In various embodiments, the stabilizer 600 may be a vertical stabilizer (i.e., a fin, a tail fin, a vertical plank) or a horizontal stabilizer (i.e., a horizontal fin, a horizontal plank) of the aircraft. As shown in FIG. 6, the energy absorbing assembly 110 may include a first portion 122 (e.g. an upper portion), a second portion (e.g., a lower portion) 124, and a retractable section 630 (i.e., a resettable section) (e.g., a mechanical retractable section). The retractable section 630 may be at least partially affixed to the first portion 122 and is configured to enable displacement of the second portion 124 of the stabilizer 100 with respect to the first portion 122. As depicted, the energy absorbing assembly 110 in FIG. 6 is substantially similar in construction, materials, and operation to the first positioning (i.e., prior to an impact event) of the energy absorbing assembly 110 in FIG. 1A, with one notable distinction that the retractable section 630 includes one or more energy absorption devices 630. Suitably, the one or more energy absorption devices 630 may be adjoined to the first and second portions 122, 124 such that the stabilizer 600 has an optimally sleek and precise aerodynamic shape as per build requirements. The energy absorption device(s) 630 may include any mechanical device having energy absorption capabilities. Although not shown, with respect to construction and operation, the energy absorbing assembly 110 of the stabilizer 600 may be depicted in a similar manner as described in FIG. 1B for the second positioning (i.e., after an impact event). In certain implementations (not shown), the one or more energy absorption devices 630 may be attached or coupled to the first and second portions 122, 124 via brackets or other types of fasteners. As illustrated, the cross-sectional top-view in FIG. 6 depicts the X-direction, the Y-direction, and the Z-direction as the height of the stabilizer 600 (that extends vertical outward from the page).

Figure 7:
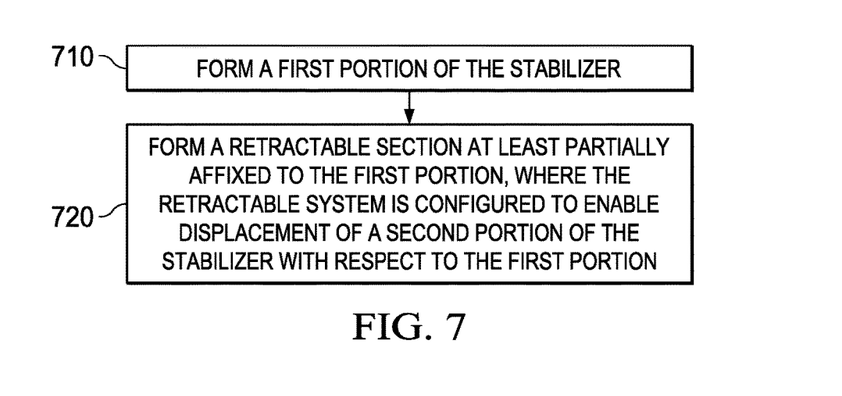
FIG. 7 is a particular illustrative aspect of methods in accordance with implementations of various techniques described herein.

Referring to FIG. 7, a method of energy absorption 700 applicable for each of the above-described stabilizers is shown. The operation 700 may be performed by any of the stabilizer implementations as described herein including stabilizers 100, 300, 400, 500, and 600 as described with reference to FIGS. 1, 3, 4, 5, and 6 (as well as described implementations that are not shown).

At 710, the method 700 includes forming a first portion of the stabilizer. For example, as shown in FIGS. 1, 3, 4, 5, and 6, a first portion 122 may be formed in a proximal location of the stabilizer (100, 300, 400, 500, 600) (as compared to the second portion 124).

At 720, the method 700 includes forming a retractable section at least partially affixed to the first portion, where the retractable section may be configured to enable displacement of a second portion of the stabilizer with respect to the first portion. For example, as shown in FIGS. 1, 3, 4, 5, and 6, a retractable section (130, 330, 430, 530, 630) that is at least partially affixed to the first portion 122 may be formed. Further, the retractable section (130, 330, 430, 530, 630) may be configured to enable displacement of a second portion 124 of the stabilizer (100, 300, 400, 500, 600) with respect to the first portion 122.

Each of the processes of illustrative method 700 may be performed or carried out by a system integrator, a third party, and/or an operator (e.g., an aerodynamicist or an aerospace designer). For the purposes of this description, a system integrator may include, without limitation, any number of manufacturers and major-system subcontractors; a third party may include, without limitation, any number of vendors, subcontractors, and suppliers; and an operator may be a leasing company, military entity, service organization, and so on.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure. Different examples of the device(s) and method(s) disclosed herein include a variety of components, features, and functionalities. It should be understood that the various examples of the device(s) and method(s) disclosed herein may include any of the components, features, and functionalities of any of the other examples of the device(s) and method(s) disclosed herein in any combination, and all of such possibilities are intended to be within the scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A stabilizer of an aircraft comprising:
an energy absorbing assembly comprising:
a first portion of the stabilizer; and
a retractable section at least partially affixed to the first portion,
an energy absorbing mechanism within the retractable section that is configured to enable displacement of the retractable section parallel with a longitudinal span of the stabilizer of a second portion of the stabilizer with respect to the first portion.

2. The stabilizer of claim 1, wherein the displacement of the second portion of the stabilizer is one of linear, axial, or angular displacement.

3. The stabilizer of claim 1, further comprising:
an outer skin enclosing the first and second portions, wherein the outer skin is made of a rigid material.

4. The stabilizer of claim 3, further comprising:
an air gap between the first and second portions of the stabilizer, wherein the air gap is enclosed by the outer skin.

5. The stabilizer of claim 4, wherein in response to an impact event of a distal end of the stabilizer, the second portion is configured to at least partially resistively displace the air gap.

6. The stabilizer of claim 1, wherein in response to an impact event of a distal end of the stabilizer, the second portion is constructed for either elastic or plastic deformation.

7. A stabilizer of an aircraft comprising:
an energy absorbing assembly comprising:
a first portion of the stabilizer; and
a retractable section at least partially affixed to the first portion, wherein the retractable section is configured to enable displacement of the retractable section parallel with a longitudinal span of the stabilizer of a second portion of the stabilizer with respect to the first portion; and
one or more plates each comprising an aperture, wherein the one or more plates are at least partially adjoined to the first portion of the stabilizer.

8. The stabilizer of claim 7, wherein the retractable section further comprises:
a fastener configured to secure a first end of one plate of the one or more plates to the first portion of the stabilizer.

9. The stabilizer of claim 8, wherein a diameter of the fastener is greater than a width of the aperture.

10. The stabilizer of claim 7, wherein in response to an impact event of a distal end of the stabilizer, the retractable section is configured to align displacement of the second portion along the aperture and proximate the first portion.

11. The stabilizer of claim 7, wherein the one or more plates comprise at least first and second plates positioned on opposing sides of the stabilizer.

12. The stabilizer of claim 7, wherein the one or more plates comprise a U-shaped plate, wherein the retractable section further comprises at least two fasteners, and wherein the at least two fasteners are configured to secure first ends of the U-shaped plate to the first portion of the stabilizer.

13. The stabilizer of claim 7, wherein the retractable section is configured for one or more energy absorption metrics, wherein the energy absorption metrics correspond to different magnitudes of sliding friction.

14. The stabilizer of claim 1, wherein the retractable section comprises one or more mechanical dampers.

15. The stabilizer of claim 1, wherein the retractable section comprises one or more energy absorption devices.

16. The stabilizer of claim 1, wherein the energy absorbing assembly comprises an aerodynamic shape.

17. A method of energy absorption by a stabilizer, comprising:
setting, in a first positioning, first and second portions of the stabilizer, wherein, in the first positioning, the first and second portions are encased in an outer skin, separated by an air gap, and adjoined by a retractable section; and in response to an impact event of a distal end of the stabilizer, engaging an energy absorbing mechanism within a retractable section of the stabilizer to resistively displace the retractable section parallel with a longitudinal span of the stabilizer the second portion to converge the first portion over the air gap.

18. The method of claim 17, further comprising:
evaluating, in a second positioning, energy absorption metrics in the retractable section of the stabilizer, wherein, in the second positioning, the second portion is proximate to the first portion of the stabilizer, the air gap is at least partially eliminated, and the outer skin is detached from the stabilizer.

19. A method of energy absorption by a stabilizer, comprising:
forming a first portion of the stabilizer; and
forming a retractable section at least partially affixed to the first portion, and
forming an energy absorbing mechanism within the retractable section;
wherein the energy absorbing mechanism is configured to enable displacement of the retractable section parallel with a longitudinal span of the stabilizer of a second portion of the stabilizer with respect to the first portion.

20. The method of claim 19, wherein forming the retractable section comprises forming at least one of one or more plates or one or more coil spring mechanisms.

* * * * *